US008428624B2

(12) United States Patent
Benco et al.

(10) Patent No.: US 8,428,624 B2
(45) Date of Patent: Apr. 23, 2013

(54) METHOD AND SYSTEM FOR NETWORK SUPPORT FOR OPTIMIZED PAGING OF COMMUNICATION DEVICES

(75) Inventors: David S. Benco, Winfield, IL (US); Paresh Kanabar, Naperville, IL (US); John C. Nguyen, Naperville, IL (US)

(73) Assignee: Alcatel Lucent, Paris (FR)

( * ) Notice: Subject to any disclaimer, the term of this patent is extended or adjusted under 35 U.S.C. 154(b) by 825 days.

(21) Appl. No.: 12/008,411

(22) Filed: Jan. 11, 2008

(65) Prior Publication Data
US 2009/0181647 A1    Jul. 16, 2009

(51) Int. Cl.
*H04W 68/00* (2009.01)
(52) U.S. Cl.
USPC .............................. 455/458; 455/459; 455/460
(58) Field of Classification Search .......................... None
See application file for complete search history.

(56) References Cited

U.S. PATENT DOCUMENTS

| 5,533,094 A * | 7/1996 | Sanmugam ................. 455/426.1 |
| 6,026,306 A * | 2/2000 | Foladare et al. ............ 455/456.5 |
| 6,351,641 B2 * | 2/2002 | Verkama ..................... 455/426.1 |
| 6,745,039 B1 * | 6/2004 | Di Lalla ........................ 455/458 |
| 6,925,309 B2 * | 8/2005 | Needham et al. ............. 455/519 |
| 7,149,535 B1 * | 12/2006 | Chaturvedi et al. ........... 455/458 |
| 2010/0184458 A1 * | 7/2010 | Fodor et al. .................... 455/522 |

* cited by examiner

*Primary Examiner* — Kamran Afshar
*Assistant Examiner* — Sayed T Zewari
(74) *Attorney, Agent, or Firm* — Carmen Patti Law Group, LLC

(57) ABSTRACT

A method in one application of maintaining a paging status associated with a communication device. The method also comprises paging the communication device based on the paging status.

A system in one application comprising a communications controller configured to store a paging status that is associated with a communication device. The system further comprising a communications manager communicatively coupled to the communications controller. Also, at least one data store is communicatively coupled to the communications controller. The communications controller pages a communication device based on a paging status. The paging status is stored in one of the at least one data store.

18 Claims, 3 Drawing Sheets

METHOD AND SYSTEM FOR NETWORK SUPPORT FOR OPTIMIZED PAGING OF COMMUNICATION DEVICES

TECHNICAL FIELD

The present invention is directed to a method and system for optimizing the paging of communication devices and only paging communication devices with an active paging status.

BACKGROUND

In recent years the use of mobile phones has become more common. With the increased popularity of mobile phones comes an increased load on wireless network infrastructure. Because of the high demand for resources associated with wireless network infrastructure, wireless service providers desire optimal use of each component of their infrastructure. The paging channel is one piece of wireless infrastructure that service providers want to use optimally. By optimizing use of the paging channel, the service provider hopes to maximize busy hour call attempts in order to serve an ever increasing number of subscribers. One way to maximize busy hour call attempts is to forgo paging mobiles that are unable to respond to page messages.

Before a mobile phone has a dedicated voice channel, it communicates with an MSC, via a base station, by receiving messages on a paging channel and sending messages on an access channel. The paging channel is used to inform a mobile phone of an attempt to complete a call to the mobile. The access channel is used by a mobile phone to inform a Mobile Switching Center (MSC) of a location update, a registration attempt, an attempt to originate a call or other orders and messages. When a mobile phone turns off, it sends a power-down registration to the MSC. The MSC notes that the mobile is inactive and forgoes paging the mobile until the mobile is active again. By not paging a mobile device, an MSC saves paging channel resources for page attempts to mobiles that are more likely to respond.

One characteristic of wireless environments is that communications are not always completed as planned. For example, if a subscriber powers down a mobile device in a bad RF environment such as an elevator, an office, or even a home, an MSC may not receive a power-down registration message. Because the power-down message is not received, the mobile device is not marked inactive at the MSC. If there is an attempt to complete a call to a mobile device that has powered down without sending a power-down registration message, the MSC pages the mobile device even though the mobile device cannot respond to the page. Paging a mobile that cannot respond is an undesired waste of paging channel resources.

Thus a need exists to maximize paging channel resources by abstaining from paging mobiles that are unlikely to respond. A further need exists for a method and system for determining which mobiles may not respond to pages.

SUMMARY

A method in one application of maintaining a paging status associated with a communication device. The method further comprises paging the communication device based on the paging status.

A system in one application comprising a communications controller configured to store a paging status that is associated with a communication device. The system further comprising a communications manager communicatively coupled to the communications controller. Also, at least one data store is communicatively coupled to the communications controller. The communications controller pages a communication device based on a paging status. The paging status is stored in one of the at least one data store.

DESCRIPTION OF THE DRAWINGS

Features of example implementations of the invention will become apparent from the description, the claims and the accompanying drawings in which:

DETAILED DESCRIPTION

Figure 1:
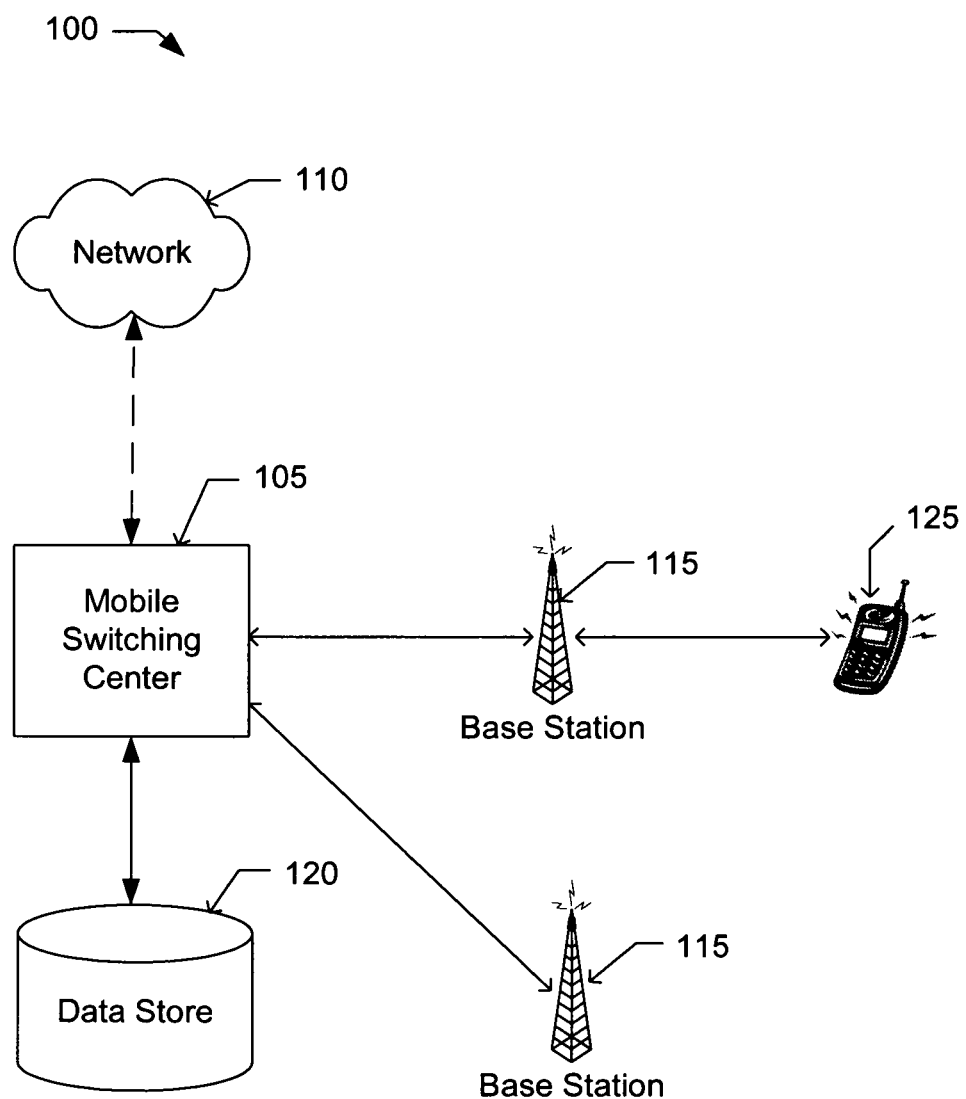
FIG. 1 is a system diagram of a network in which the system for network support for optimized paging of communication devices may reside.

Turing to FIG. 1, a system 100 diagram of an example network in which the system for network support for optimized paging of communication devices may reside.

The system 100 is comprised of a Mobile Switching Center (MSC) 105 that is communicatively coupled to a network 110, at least one base station 115, and at least one data store 120. The network 110 may be a PSTN, an Internet Protocol network or any other network capable of generating a request to complete a call to a mobile device. The data store 120 may be an HLR, a voice mailbox, or any other type of data store capable of communicating and storing information to or from the MSC 105. Alternatively, the at least one data store 120 may be incorporated into the MSC 105.

In this example diagram the MSC 105 acts as a communications intermediary between the network 110 and a communication device 125. For example, the network 110 may request that the MSC 105 complete a call to the communication device 125. The MSC 105 completes the call via the base station 115. The MSC 105 provides a communication path to the communication device 125 so that communications between the communication device 125 and the network 110 may be accomplished. Alternatively, the communication device 125 may request that the MSC 105 provide a connection to the network 110 so that communications between the network 110 and the communication device 125 may be accomplished. The Method and System for Network Support for Optimized Paging of Communication Devices may reside on the MSC 105. The method and system, however, may reside on other network components, or parts of the method and system may be spread throughout different network components.

Although there is only one data store 120 depicted in FIG. 1, many data stores may be communicatively coupled to the MSC 105. For example, the MSC 105 may communicate with a subscriber database for retrieving subscriber records, a system database for retrieving system parameters, or a voice mailbox for storing and retrieving voice messages. These databases may be kept on one network component, such as an HLR, or the databases may be spread throughout different network components.

The MSC 105 is also communicatively coupled with the base station 115. The MSC 105 communicates with the communication device 125 via the base station 115. This communication may occur by sending messages to the base station 115. The base station 115 may forward these messages to the communication device 125. Among the communications between the base station 115 and the MSC 105 are page messages and registration messages. The communication device 125 typically sends registration messages when the communication device 125 wants to inform the MSC of some status, such as a change in location. Page messages are typically sent when an MSC 105 attempts to establish a call with the communication device 125.

The MSC 105 may page a communication device 125 by sending page messages to the area where the communication device 125 was last known to reside. By paging a communication device 125 in an area where the communication device 125 was last located, the MSC 105 attempts to successfully reach the communication device 125 by sending the fewest number of page messages. When the communication device 125 receives a page message, the communication device responds with a page acknowledgement that contains the location of the communication device 125 along with other information needed to establish a call with the communication device 125.

Paging occurs on a downlink channel of the base station 115 typically referred to as a paging channel. The base station 115 sends orders and messages, including page messages, on the paging channel. A page message may notify the communication device 125 that someone is attempting to complete a call to the communication device 125.

The communication device 125 acknowledges a page on an access channel. The access channel may also be used, for example, to send registration, mobile origination, and location update messages to the MSC 105. There are a number of different types of registration messages. For example, a power-down registration message informs the MSC 105 that the communication device 125 is powering down. When a subscriber powers down a communication device 125, the communication device 125 sends a power-down registration to the MSC 105. Another type of registration message is a power-up registration message. A power-up registration message informs the MSC 105 that a communication device 125 is powering up. When a subscriber powers up a communication device 125, the communication device 125 sends a power-up registration message to the MSC 105. These are just two examples of registration messages. The communication device 125 may also send other types of registration messages. This is a brief explanation of how the MSC 105 communicates with the communication device 125 via the base station 115 to send and receive paging and registration messages. The MSC 105 may send other types of messages that have not been discussed.

Figure 2:
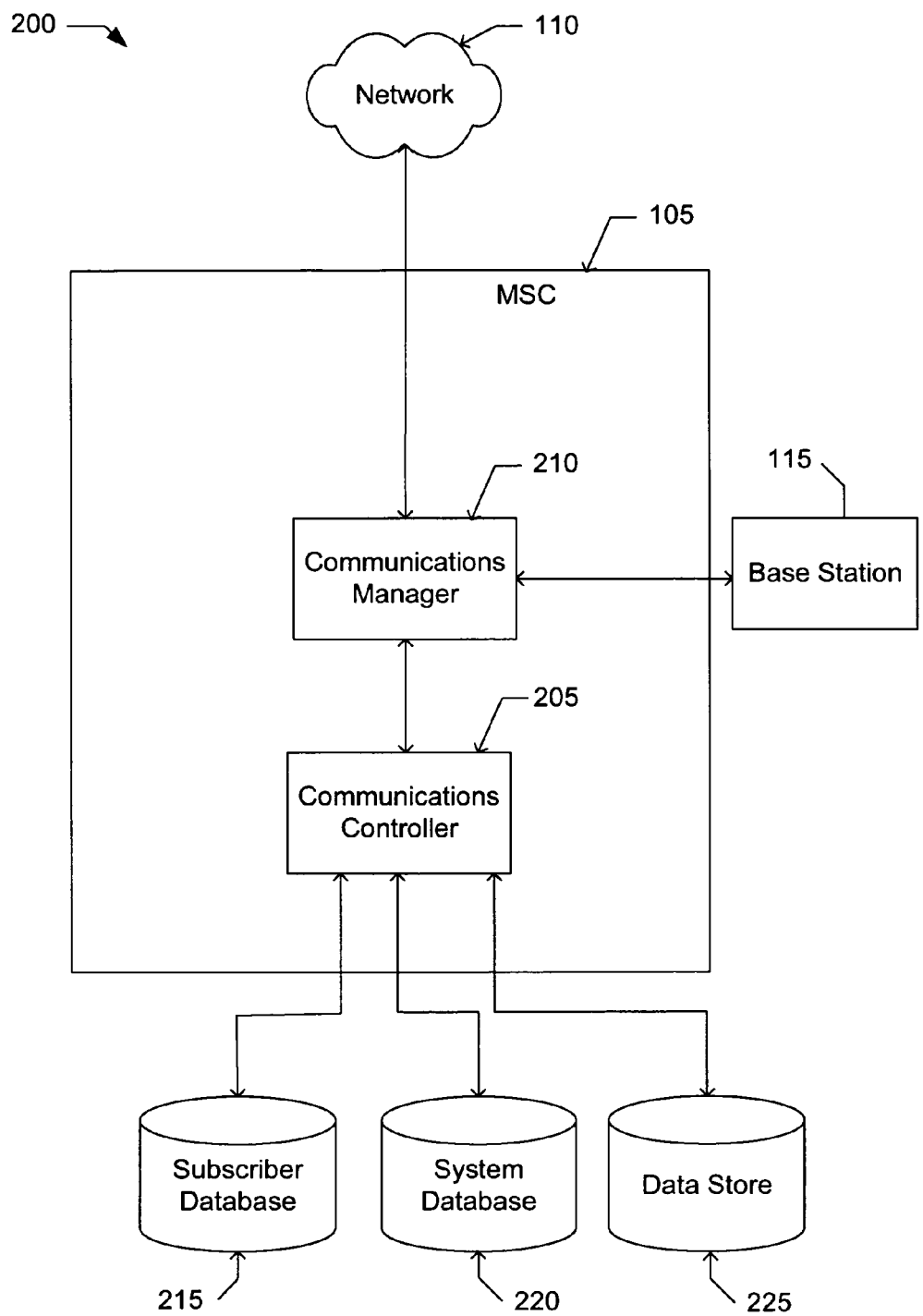
FIG. 2 is a functional block diagram of the system for network support for optimized paging of communication devices.

Turning to FIG. 2, a functional block diagram 200 of the System for Network Support for Optimized Paging of Communication Devices. FIG. 2 is a further decomposition of FIG. 1. The network 110 and the base station 115 may be the same network 110 and base station 115 as discussed in FIG. 1. Although a communication device is not depicted in FIG. 2, the communication device 125 of FIG. 1 may also reside in the system depicted in FIG. 2. The MSC 105 depicted in FIG. 2 may be the same MSC 105 as depicted in FIG. 1.

The MSC 105 as shown in FIG. 2 is further decomposed into more components. The MSC 105 may further comprise a communications controller 205 and a communications manager 210. In this example, the system for network support for optimized paging of communication devices resides in the communications controller 205. Although in this example the system resides in the communications controller 205, the system may reside in a different component of the MSC 105 or in another network component other than the MSC 105.

The communications manager 210 is communicatively coupled with the network 110, the base station 115, and the communications controller 205. In the system 200 depicted in FIG. 2, the communications manager 210 acts as an intermediary between the network 110 and the base station 115. The communications manager 210 also acts as an intermediary between the network 110 and the communications controller 205. If the network 110, base station 115, or communications controller 205 want to communicate with each other, the communications may pass through the communications manager 210.

The communications controller 205 is communicatively coupled to the communications manager 210, a subscriber database 215, a system database 220, and a data store 225. The communications controller 205 may retrieve subscriber records from the subscriber database 215. One of ordinary skill in the art will readily appreciate that a subscriber record may contain subscriber information such as a communication device identifier, status of service, and other information related to a subscriber. The communications controller 205 may retrieve subscriber records from the subscriber database 215. The communications controller 205 may need to access a subscriber record to retrieve information about a subscriber to complete a call to the communication device 125. The communications controller 205 may also set information in a subscriber record and store the subscriber record back into the subscriber database 215. The communications controller 205 may retrieve or set information in the subscriber database 215 by sending an inter-processor message, sending an intra-processor message, by making a function call, or by any other method of retrieving information from the subscriber database 215.

The communications controller 205 may also retrieve system parameters from the system database 220. These system parameters may include information related to system features of paging or registration. The communications controller 205 may retrieve information from the system database 220 by sending an inter-processor message, by sending an intra-processor message, by making a function call or by any other method of retrieving information from the system database 220.

The communications controller 205 is also communicatively coupled to a data store 225. The data store 225 in this example may be, for example, a voice mailbox. The communications controller 205 may store voice messages or other information associated with a communication device in the voice mailbox.

Although the subscriber database 215, the system database 220, and the data store 225 are depicted as separate entities in FIG. 2, one of ordinary skill in the art will readily appreciate that is possible that the information stored in these databases 215,220,225 do not have to be stored in separate databases. The information could be stored in one database, or reside in databases that reside on the same physical medium.

The communications controller 205 may execute basic call functions such as paging and monitoring a status of the communication device 125. The status of the communication device 125 may be contained in a subscriber record stored in the subscriber database 215. The communications controller 205 may retrieve the subscriber record associated with the communication device 125 to get the status of the communication device 125. A subscriber record may be associated with the communication device 125 based on an International Mobile Subscriber Identity (IMSI), a mobile identification number, an electronic serial number, or any other way of uniquely associating a subscriber record with the communication device 125.

The communications controller 205 may also set the status of the communication device 125. The communications controller 205 may set the status of the communication device 125 by retrieving a subscriber record from the subscriber database 215, setting the status of the communication device 125 in the subscriber record, and storing the subscriber record back in the subscriber database 215. The communication device 125 may have one of a number of statuses. For example, the status of the communication device 125 may be set to inactive. This may indicate, for example, that the communication device 125 is powered down. Alternatively, the status of the communication device 125 may be set to active. This may indicate that the communication device 125 is powered up and ready to receive calls. The two statuses here are presented as examples. A communication device 125 may be associated with other statuses or may not have an associated status.

The status of the communication device 125 may determine how the communications controller 205 handles a request to complete a call to the communication device 125. If the network 110 requests to establish a call with the communication device 125 and the communication device 125 has an active status, the communications controller 205 may initiate paging of the communication device 125. If the communication device 125 has an inactive status, the communications controller 205 may forgo paging the communication device 125 and route the incoming call to a voice mailbox contained on the data store 225.

The status of a communication device 125 may change as the communications controller 205 receives messages from the communications manager 210. For example, if the communications controller 205 receives a power-down registration associated with the communication device 125, the communications controller 205 may set the status associated with the communication device 125 to inactive. On the other hand, if the communications controller 205 receives a power-up registration associated with the communication device 125, the communications controller 205 may set the status associated with the communication device 125 to active.

Thus the communication device 125 may have an associated status and the status may determine whether or not the communication device is paged. The communications controller 205 may also maintain a paging status that is associated with a communication device as well as a status. The paging status may be maintained instead of the status, or the paging status may be maintained along with the status. The communications controller 205 may forgo paging the communication device 125 based on a paging status associated with the communication device 125. The paging status associated with the communication device 125 may be set to active or inactive. An active paging status may indicate that the communication device 125 is ready to receive pages. An inactive paging status may indicate that communication device 125 is not ready to receive pages. If the paging status associated with a communication device 125 is set to inactive, the communications controller 205 may forgo paging the communication device. On the other hand, if the paging status associated with the communication device 125 is set to active, the communications controller 205 may page the communication device 125.

A paging status of the communication device 125 is determined based on a page failure threshold and a page failure total. The communication device 125 may have an associated paging status and page failure total. The paging status and page failure total may be associated with the communication device 125 based on an IMSI, a mobile identification number, an electronic serial number, or any other way of uniquely associating a variable with a communication device.

The page failure threshold may be a system wide parameter. The page failure threshold is maintained on a system-wide basis. The page failure threshold may be stored in the system database 220.

When the communications manager 210 receives a request to establish a call to the communication device 125, the communications manager 210 forwards the request to the communications controller 205. The communications controller 205 determines the paging status of the communication device 125. If the paging status of the communication device 125 is inactive, the communications controller 205 may forward the call to a voice mailbox that may reside on the data store 225. If the paging status of the communication device 125 is set to active, the communications controller may initiate paging of the communication device 125.

A paging status associated with the communication device 125 may be determined based on a page failure total and a page failure threshold. The page failure total associated with the communication device 125 is incremented each time a no page response associated with the communication device 125 is received. Each time the communications controller 205 attempts to page the communication device 125, the communications controller 205 sends a page message to the communication device 125 via the communications manager 210 and the base station 115. This results in the base station 115 sending a page message to the communication device 125. If the communication device 125 does not respond to the page message, the base station 115 sends a no page response message to the communications controller 205. Upon receipt of the no page response message, the communications controller 205 may increment the page failure total associated with the communication device 125. If the page failure total associated with the communication device 125 exceeds the page failure threshold, the communications controller 205 may set the paging status associated with the communication device 125 to inactive. In an alternate embodiment, if the page failure total associated with the communication device 125 equals the page failure threshold, the communications controller 205 may set the paging status associated with the communication device 125 to inactive.

The paging status of the communication device 125 may be set to active if the communications controller 205 receives paging status messaging associated with a communication device 125. Paging status messaging may comprise messages such as a power-up registration, a location based registration, or any other type of message that may be sent on an access channel. When the communications controller 205 receives paging status messaging, the communications controller 205 resets the page failure total associated with the communication device 125 to zero ('0').

The paging status of a communication device 125 may be stored in the subscriber database 215. The communications controller 205 may retrieve the paging status of a communication device 125 from the subscriber database 215 and maintain the paging status in local memory. Alternatively, the communications controller 205 may not maintain a paging status in local memory and instead retrieve the paging status of the communication device 125 from the subscriber database 215 each time the paging status of the communication device 125 is needed. Alternatively the communications controller 205 may retrieve the paging status from the subscriber database 215 at various times during a call attempt. Similarly, the communications controller 205 may set a paging status of a communication device 125 in the subscriber database 215 at various points of a call. Although the communication device 125 paging status in this example is contained in the subscriber database 215, it will be readily apparent to one of ordinary skill in the art that this information may be stored in any node or component of a telecommunications network.

The communications controller 205 is also configured to maintain a page failure threshold. The communications controller 205 may retrieve the page failure threshold from the system database 220. The communications controller 205 may retrieve the page failure threshold periodically, or it may retrieve the page failure threshold each time it processes a call, or it may retrieve the page failure threshold as part of an initialization process. Although the page failure threshold is maintained in the system database 220, it will be readily apparent to one of ordinary skill in the art that the page failure threshold may be stored in any node or component in a telecommunications network.

Because the page failure threshold is a system wide variable, an operator may adjust this variable as needed. Thus, in an attempt to maximize the use of system resources, an operator may adjust the page failure threshold to a lower number during peak call hours. On the other hand, in off-peak hours when system resources are not as scarce, an operator may set the page failure threshold to a higher number.

The system 200 in one example comprises a plurality of components such as one or more of computer software components. A number of such components can be combined or divided in the system 200. An example component of the system 200 employs and/or comprises a set and/or series of computer instructions written in or implemented with any or a number of programming languages, as will be appreciated by those skilled in the art. The system 200 in one example comprises an (e.g., horizontal oblique, or vertical) orientation, with the description and figures herein illustrating one example orientation of the system 200, for explanatory purposes.

The system 200 in one example employs one or more computer-readable signal-bearing media. The computer-readable signal-bearing media store software, firmware and/or assembly language for performing one or more portions of one or more implementations of the invention. The computer-readable signal-bearing medium for the system 200 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

Figure 3:
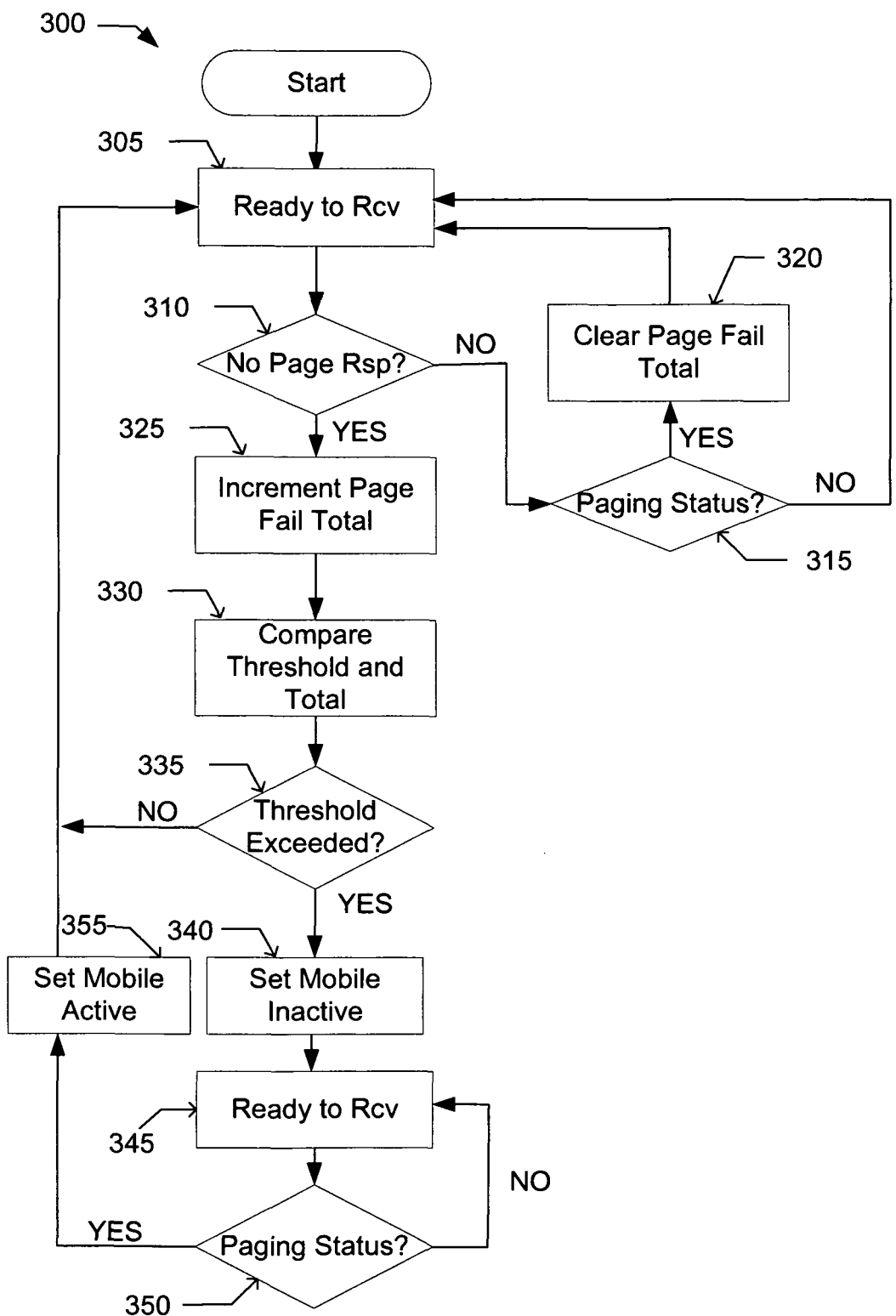
FIG. 3 is a representation of one implementation of a method for network support for optimized paging of communication devices.

Turning to FIG. 3, a method 300 in one example for optimized paging of communication devices.

The method 300 begins in a state where it is ready to receive 305 messages. If the method 300 receives a message, the method 300 determines if the message is a no page response message 310. If the message is not a no page response message, the method 300 determines if the message is a paging status message 315. If the message is a paging status message, the method 300 clears the page total 320 and the method 300 waits for further incoming messages 305. If the message is not a paging status message, the method 300 waits for further incoming messages 305.

If the method 300 receives a no page response message 310, the page failure total is incremented 325, the page failure threshold is compared with the page failure total 330 and the method 300 determines if the page failure total exceeds the page failure threshold 335. In an alternate embodiment the method 300 determines if the page failure total is equal to the page failure threshold. Thus, the method 300 in the alternate embodiment takes the same action when the page failure total equals the page failure threshold, as the method would take in the described embodiment when the page failure total exceeds the page failure threshold.

If the page failure total does not exceed the page failure threshold the method 300 continues to wait for incoming messages 305. If the page failure total exceeds the page failure threshold the method 300 sets a paging status associated with the communication device 125 to inactive 340. The method waits for further messages 345.

If the method 300 receives a further message, the method 300 determines if the message is a paging status message 350. If the message is not a paging status message the method 300 continues waiting for further messages 345. If an incoming message is a paging status message, the method 300 sets the paging status associated with the communication device to active 335. The method 300 waits for further messages 305.

The steps or operations described herein are just for example. There may be many variations to these steps or operations without departing from the spirit of the system and method. For instance, the steps may be performed in a differing order, or steps may be added, deleted, or modified.

Although example implementations of the system and method have been depicted and described in detail herein, it will be apparent to those skilled in the relevant art that various modifications, additions, substitutions, and the like can be made without departing from the spirit of the method and these are therefore considered to be within the scope of the system and method as defined in the following claims.

We claim:

1. A method comprising the steps of:
    maintaining a paging status of a communication device that indicates whether the communication device is ready to receive pages, wherein an inactive paging status indicates that the communication device is not ready to receive pages and an active paging status indicates that the communication device is ready to receive pages;
    setting the paging status based on a received no page response message, or a received paging status message, where the paging status message comprises at least one of a power-up registration message or a location based registration message; and
    determining whether to initiate paging of the communication device based on the paging status, and paging the communication device accordingly;
    wherein the step of maintaining the paging status comprises:
        maintaining a page failure total of the communication device;
        maintaining a page failure threshold;
        comparing the page failure total and the page failure threshold; and
        setting the paging status to inactive, if the page failure total exceeds the page failure threshold.

2. The method of claim 1 wherein the page failure total is updated each time a no page response message is received where the no page response message indicates that attempts to page the communication device have failed and the no page response message is received from a base station.

3. The method of claim 1 wherein the page failure threshold is a system-wide parameter.

4. The method of claim 1 wherein the page failure total is reset upon receipt of the paging status message.

5. The method of claim 1 wherein the step of maintaining the paging status comprises setting the paging status to active upon receipt of the paging status message.

6. The method of claim 1 wherein the step of setting the paging status comprises updating the paging status in a data store.

7. The method of claim 1 wherein the step of determining whether to initiate paging of the communication device based on the paging status associated with the communication device comprises initiating paging of the communication device only if the paging status associated with the communication device is set to active.

8. The method of claim 1 wherein the step of determining whether to initiate paging of the communication device based on the paging status associated with the communication device comprises re-routing a communication destined for the communication device if the paging status associated with the communication device is set to inactive.

9. The method of claim 8 wherein re-routing the communication destined for the communication device comprises re-routing the communication to a data store.

10. A system comprising:
a communications controller configured to store a paging status of a communication device that indicates whether the communication device is ready to receive pages, wherein an inactive paging status indicates that the communication device is not ready to receive pages and an active paging status indicates that the communication device is ready to receive pages; and
wherein the communications controller determines whether to initiate paging of the communication device based on the paging status and pages the communication device accordingly;
wherein the communications controller is configured to set the paging status based on a received no page response message or a received paging status message, where the paging status message comprises at least one of a power-up registration message or a location registration message;
wherein the communications controller is configured to:
maintain a page failure total of the communication device;
maintain a page failure threshold;
compare the page failure total and the page failure threshold;
set the paging status to inactive if the page failure total exceeds the page failure threshold, wherein inactive indicates that the communication device is not ready to receive pages; and
set the paging status to active and reset the page failure total upon receipt of the paging status message.

11. The system of claim 10 wherein the no page response message indicates that a base station timed out waiting for the communication device to respond to a page message; and the page failure total is updated based on the no page response message.

12. The system of claim 10 wherein the communications controller is configured to:
receive the paging status message from a communications manager, where the communications manager is communicatively coupled with the communications controller; and
set the paging status associated with the communication device to active if the paging status message is received.

13. The system of claim 10 wherein the communications controller is configured to re-route communications destined for the communication device to a data store if the paging status associated with the communication device is set to inactive where the data store is communicatively coupled with the communications controller.

14. A system comprising:
a mobile switching center (MSC) that receives a no page response message and in response to receiving the no page response message the MSC increments a page failure total of a communication device,
wherein when the page failure total is greater than a page failure threshold the MSC sets a paging status of the communication device to inactive, where inactive indicates that the communication device is not ready to receive pages;
upon receipt of a power-up registration message, the MSC sets the paging status to active, where active indicates that the communication device is ready to receive pages; and
upon receipt of a request to page the communication device, the MSC pages the communication device only if the paging status is active.

15. The system of claim 14 wherein the MSC sets the paging status to active upon receipt of a location based registration message.

16. The system of claim 14 wherein receipt of the no page response message indicates that a base station timed out waiting for a page response from the communication device.

17. The method of claim 1, further comprising the step of:
forgoing paging of the communication device while the paging status of the communication device is inactive.

18. The system of claim 10, wherein the communications controller is configured to forgo paging the communication device while the paging status of the communication device is inactive.

* * * * *